Sept. 15, 1959        S. M. MOODY        2,903,867

ZERO-BACKLASH COUPLING FOR SHAFTS OR THE LIKE

Filed Feb. 17, 1956

INVENTOR.
Steven M. Moody
BY
Attorney

United States Patent Office 2,903,867
Patented Sept. 15, 1959

2,903,867

ZERO-BACKLASH COUPLING FOR SHAFTS OR THE LIKE

Steven M. Moody, Grand Rapids, Mich., assignor to Lear, Incorporated, Grand Rapids, Mich., a corporation of Illinois Application February 17, 1956, Serial No. 566,185

5 Claims. (Cl. 64—15)

This invention relates to a device for coupling two rotatable members which are subject to axial misalignment, either due to relative eccentricity, angular displacement of the axes, or both such eccentricity and angular displacement. Furthermore, the invention has reference to a one-piece device of the character outlined which requires no tools to install, and which may be manufactured from readily available raw material requiring simple heat treatment.

The device of the invention is adopted primarily to coupling shafts through which torque of low order is transmitted as for example, the driving of the rotatable part of certain kinds of electrical components such as synchros and potentiometers which are driving from a power shaft. Inasmuch as the invention coupling is extremely light and of one piece and is so associated with the shafts as to render dislodgment by vibration impossible the same finds a wide field of use aboard aircraft where weight savings and resistance to vibrational effects are important desiderata.

Another advantage of the invention coupling lies in its resilience whereby shock may be readily absorbed and fatigue failure rendered virtually impossible.

The device requires no set screws, splines, keys or other expedients to render the same secure in operative position and yet is so constructed that assembly and disassembly may be effected digitally.

Since the device has no moving parts lubrication is eliminated. Thus, in proximity to electrical components, the problems attendant upon oil and grease which may adversely affect the electrical characteristics of a circuit are obviated.

Another object lies in providing a coupling as aforesaid which is capable of absorbing end play thereby to rectify such errors in function of the coupled parts as might otherwise occur from unaccommodated end play. Moreover, angular backlash has been completely eliminated.

Other features of the invention will become apparent from the description to ensue which, taken with the accompanying drawing, will disclose a preferred mode of carrying the invention into practice. In this drawing.

Figure 1:
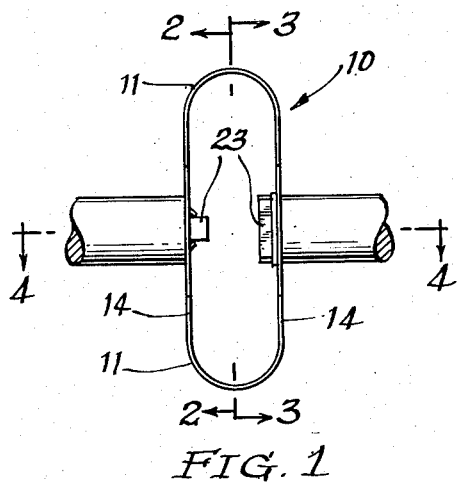
Fig. 1 is a side elevational view of my improved coupling in its relation to a pair of shafts.
Figure 2:
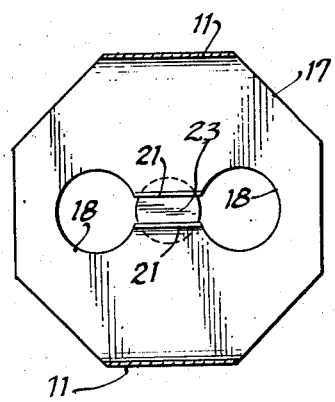
Fig. 2 is a cross section taken on the line 2—2 of Fig. 1.
Figure 3:
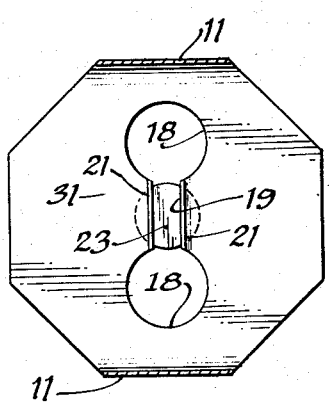
Fig. 3 is a cross section taken on the line 3—3 of Fig. 1.
Figure 4:
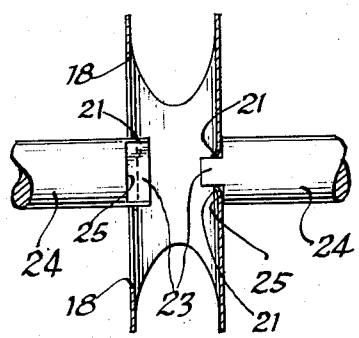
Fig. 4 is a cross section taken on the line 4—4 of Fig. 1.
Figure 5:
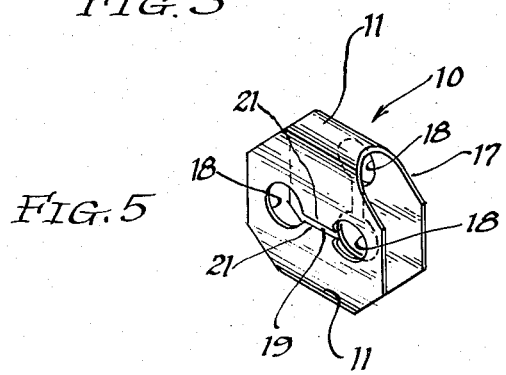
Fig. 5 is a perspective view of the coupling per se.

Turning to the drawing the invention coupling 10 comprises a section of metal tubing which may have been initially circular and then flattened to the flat oval configuration best seen in Fig. 1. Circular tubing is preferred as being readily available and the same may be flattened between a pair of inexpensive flat plates. If desired the foregoing operation may be performed in suitably shaped dies to avoid possible buckling. In any case the provision of the substantially semi-cylindrical curved walls 11—11 is a feature of the invention whereby axial thrust is accommodated by flexure thereof. To facilitate this spring action I prefer to use a resilient material such as beryllium copper and, following forming and punching, to provide the same with a spring temper by suitable heat treatment. For one typical application I have used beryllium copper tubing of 0.020″ thickness and ½″ thickness external diameter which, when flattened, produces a dimension across the flat walls 14—14 of $\frac{5}{32}$″ and a distance externally of the walls 11—11 of $\frac{39}{64}$″. In order to reduce the curved walls 11—11 to an extent providing a preferred degree of flexure the corners of the coupling may be cut off, say along straight lines, as at 17.

Each of the flat walls 14—14 is perforated to provide a pair of substantially dumb bell shaped apertures including circular ends 18—18 cojoined by a slot 19. The margins of the latter are deformed inwardly at an angle of from 25° to 35° to the vertical to provide lips 21—21 so spaced as to grip, with some friction, the flat, parallel faces of the pertinent tongues 23—23 formed on the ends of the coupled shafts 24—24. The radial disposition of the lips 21 is such as to cause tight engagement with the tongues 23 thereby to avoid backlash and consequent wear and chatter of the parts. By reason of the spring temper characterizing the invention coupling the fingers 21 may be spaced apart a distance slightly less than the distance across flats of the tongues 23 whereupon the lips may be forced thereover and advantage taken of the "bite" which the lips will then exert on the tongues.

Desirably the axial dimension of the coupling is made slightly greater than the maximum distance measured in the same direction between the shoulders 25. By "maximum distance" I refer to that position of the shafts 24—24 wherein any end play has been eliminated. Thus the expansive character of the coupling serves to maintain zero end play.

The apertures 18 serve to define flexible zones 31 adjacent the lips 19 thereby to allow yielding of the lips 19 as the coupling is assembled with the shafts. While the lips themselves possess inherent resiliency it has been found desirable to supplement the same by providing the extended areas 31. Obviously the areas 31 may be defined otherwise than by the circular cutouts 18. However this shape is preferred to avoid sharp corners which may give rise to cracking, viz. fatigue failure.

It will be noted that the slots 19 in the respective faces of the coupling are mutually perpendicular. This orientation has been found to take optimum advantage of the spring action of the coupling as exerted in a rotational sense whereby shock of starting and stopping may be absorbed.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. Means for coupling a pair of rotatable members having substantially aligned axes of rotation comprising an element constructed and arranged to form a part of each said member, said elements being mutually confronting and spaced apart axially and each being provided with an axially-extending tongue having two, diametrically opposite flat faces and an endless band of resilient material including two opposed, relatively flat side faces cojoined by opposed, arcuate bights, each side face having an aperture including a straight sided slot terminated by circular openings of diameter greater than the width of the slot to define cantilevered, resilient marginal zones for the slot adapted to frictionally engage said tongues.

2. Coupling means in accordance with claim 1 further characterized by the provision on the margins of the slot of discrete lips disposed at an inclination to said zones for gripping said tongues.

3. Means for coupling a pair of rotatable members having substantially aligned axes of rotation comprising an element constructed and arranged to form a part of each said member, said elements being mutually confronting and spaced apart axially and each being provided with an axially-extending tongue having two, diametrically opposite flat faces and an endless band of resilient material including two opposed, relative flat side faces cojoined by opposed, arcuate bights, each side face having a pair of lips for frictionally engaging said tongues.

4. Means for coupling a pair of rotatable members having substantially aligned axes of rotation comprising an element constructed and arranged to form a part of each said member, said elements being mutually confronting and spaced apart axially and each being provided with a flat, longitudinally extending surface and an endless band of resilient material including two opposed, relatively flat side faces cojoined by opposed, arcuate bights, said band having a projection on each said side face for abutment with said surface and a slot for receiving said element.

5. A shaft coupling comprising a flattened section of metallic tube with non-circular openings in opposite flattened portions of said tube and discrete lips on the margins of said openings for gripping shafts to be coupled thereby.

References Cited in the file of this patent

UNITED STATES PATENTS

| | | |
|---|---|---|
| 1,983,094 | Neher | Dec. 4, 1934 |
| 2,171,999 | Weiland | Sept. 5, 1939 |
| 2,724,251 | Weaver | Nov. 22, 1955 |